US006080350A

United States Patent [19]

Hekal

[11] Patent Number: 6,080,350

[45] **Date of Patent: *Jun. 27, 2000**

[54] DESSICANT ENTRAINED POLYMER

[75] Inventor: Ihab M. Hekal, Stamford, Conn.

[73] Assignee: Capitol Specialty Plastics, Inc., Auburn, Ala.

[ * ] Notice: This patent is subject to a terminal disclaimer.

[21] Appl. No.: 09/086,880

[22] Filed: May 29, 1998

Related U.S. Application Data

[63] Continuation-in-part of application No. 08/812,315, Mar. 5, 1997, which is a continuation-in-part of application No. 08/611,298, Mar. 5, 1996, Pat. No. 5,911,937, which is a continuation-in-part of application No. 08/424,996, Apr. 19, 1995.

[51] Int. Cl.[7] .............................. F26B 25/16; B65B 81/26

[52] U.S. Cl. ................. 264/255; 264/173.16; 264/176.1; 264/165; 264/250; 264/259; 264/268; 264/299; 264/510; 264/DIG. 78; 34/95; 34/329; 53/400; 53/428; 53/111; 206/204; 206/95; 502/402; 502/405

[58] Field of Search ................................ 206/204; 34/95, 34/329; 502/402, 405; 53/400, 428, 111; 264/DIG. 78, 250, 259, 510, 173.16, 268, 165, 299, 176.1, 255; 252/194

[56] References Cited

U.S. PATENT DOCUMENTS

| | | |
|---|---|---|
| 1,481,971 | 1/1924 | Whiting . |
| 1,532,831 | 4/1925 | Mastin . |
| 2,202,742 | 5/1940 | McCorkhill . |
| 2,511,666 | 6/1950 | Barr . |
| 2,638,179 | 5/1953 | Yard . |
| 2,991,500 | 7/1961 | Hagen . |
| 3,013,308 | 12/1961 | Armour . |
| 3,101,242 | 8/1963 | Jackson, Jr. . |
| 3,156,402 | 11/1964 | Dupuis . |
| 3,245,946 | 4/1966 | O'Connor et al. . |
| 3,256,411 | 6/1966 | Grasty . |
| 3,322,355 | 5/1967 | Bryant . |
| 3,326,810 | 6/1967 | Dolan et al. . |
| 3,537,676 | 11/1970 | Miller . |
| 3,567,085 | 3/1971 | Flores . |
| 3,687,062 | 8/1972 | Frank . |
| 3,704,806 | 12/1972 | Plachenov et al. . |
| 3,730,372 | 5/1973 | Komendowski . |
| 3,750,966 | 8/1973 | Anderson . |
| 3,804,282 | 4/1974 | Komendowski . |

(List continued on next page.)

FOREIGN PATENT DOCUMENTS

| | | |
|---|---|---|
| 0172714 A1 | 2/1986 | European Pat. Off. . |
| 0225 593 A3 | 6/1987 | European Pat. Off. . |
| 931087639 | 9/1993 | European Pat. Off. . |
| 4013799 | 10/1991 | Germany . |
| WO 96/29603 | 9/1996 | WIPO . |
| WO 96/33108 | 10/1996 | WIPO . |
| PCT/US97/03610 | 5/1997 | WIPO . |
| PCT/WO 97/27483 | 7/1997 | WIPO . |
| PCT/WO 97/32663 | 9/1997 | WIPO . |
| PCT/WO 98/39231 | 9/1998 | WIPO . |

*Primary Examiner*—Catherine Timm
*Assistant Examiner*—Suzanne E. Mason
*Attorney, Agent, or Firm*—Dreier & Baritz, LLP.

[57] ABSTRACT

The present invention includes processes and resulting structures for producing moisture absorbing desiccant entrained polymers. A polymer is caused to assume a molten state, typically by applying heat and melting the polymer. A channeling agent is blended then reacted into the polymer so that it is distributed within the polymer. A desiccating agent is then blended into the product so that the desiccating agent is distributed within the product. The product is solidified so that the channeling agent forms passages in the product through which moisture is communicable to desiccating agent that is entrained within the product. The solidified product may be used to form plug type inserts and liners for closed containers, or it may be formed into any shaped article.

26 Claims, 3 Drawing Sheets

U.S. PATENT DOCUMENTS 3,833,406 9/1974 White .
3,926,379 12/1975 Dryden et al. .
3,929,295 12/1975 Montalbano .
4,013,566 3/1977 Taylor .
4,021,388 5/1977 Griffin .
4,029,830 6/1977 Yamamoto .
4,036,360 7/1977 Deffeyes .
4,081,397 3/1978 Booe .
4,165,743 8/1979 Denning .
4,201,209 5/1980 LeVeen et al. .
4,240,937 12/1980 Allen .
4,243,767 1/1981 Kaufman et al. .
4,284,548 8/1981 Kaufman et al. .
4,387,803 6/1983 Mercil .
4,394,144 7/1983 Aoki .
4,407,897 10/1983 Farrell et al. .
4,425,410 1/1984 Farrell et al. .
4,447,565 5/1984 Lula et al. .
4,464,443 8/1984 Farrell et al. .
4,485,204 11/1984 Nabors .
4,533,576 8/1985 Tanahashi et al. .
4,547,536 10/1985 Nabors .
4,554,297 11/1985 Dabi .
4,573,258 3/1986 Io et al. .
4,665,050 5/1987 Degan et al. .
4,686,093 8/1987 Flanigen et al. .
4,770,944 9/1988 Farrell et al. .
4,772,300 9/1988 Cullen et al. .
4,783,056 11/1988 Abrams .
4,783,206 11/1988 Cullen et al. .
4,792,484 12/1988 Moritani .
4,834,234 5/1989 Sacherer et al. .
4,969,998 11/1990 Henn .
4,994,312 2/1991 Maier et al. .
5,078,909 1/1992 Shigeta et al. .
5,114,003 5/1992 Jackisch et al. .
5,118,655 6/1992 Pedersen .
5,128,182 7/1992 Bunker et al. .
5,130,018 7/1992 Tolman et al. .
5,143,763 9/1992 Yamada et al. .
5,154,960 10/1992 Mucci et al. .
5,267,646 12/1993 Inoue et al. .
5,286,407 2/1994 Inoue et al. .
5,304,419 4/1994 Shores .
5,320,778 6/1994 Miksic et al. .
5,344,589 9/1994 Miksic et al. .
5,393,457 2/1995 Miksic et al. .
5,399,609 3/1995 Moss .
5,415,907 5/1995 Inoue et al. .
5,432,214 7/1995 Lancesseur .
5,494,155 2/1996 Evans et al. .
5,496,397 3/1996 Fischer et al. .
5,518,761 5/1996 Hatsuda et al. .
5,551,141 9/1996 De'Ath et al. .
5,580,369 12/1996 Belding et al. .
5,656,503 8/1997 May .
5,773,105 6/1998 Klett .
5,814,136 9/1998 Wood .

DESSICANT ENTRAINED POLYMER

RELATED APPLICATION

This application is a continuation-in-part of U.S. Ser. No. 08/812,315, filed Mar. 5, 1997, which in turn is a continuation-in-part of U.S. Ser. No. 08/611,298, filed on Mar. 5, 1996 now U.S. Pat. No. 5,911,937, which in turn is a continuation-in-part of U.S. Ser. No. 08/424,996, filed Apr. 19, 1995.

FIELD OF THE INVENTION

This invention relates generally to the use of desiccant material in packaging; more particularly, the present invention relates to packaging material having a desiccant contained therein. Still more particularly, the present invention relates to polymers having desiccating agents blended and reacted therein. The invention further relates to desiccant entrained polymers that include means by which desiccant located within interior portions of the polymer structure are exposed to moisture that is exterior to the polymer body. The desiccant entrained polymer of the present invention is particularly useful in the manufacture of containers and packaging for items requiring moisture reduced environments.

BACKGROUND OF THE INVENTION

There are many articles that are preferably stored, shipped and/or utilized in an environment that is as moisture free as possible. Therefore, containers and/or packages having the ability to absorb excess moisture trapped therein have been recognized as desirable. One application in which moisture absorbing containers are desired is for the shipment and storage of medications whose efficacy is compromised by moisture. The initial placement of medicines into a sealed moisture free container is usually controllable. Furthermore, the container for the medicine is selected so that is has a low permeability to moisture. Therefore, the medication will normally be protected from moisture until it reaches the end user. Once the medicine is received by the customer, however, the container must be repeatedly opened and closed to access the medication. Each time the container is opened and unsealed, moisture bearing air will most likely be introduced into the container and sealed therein upon closure. Unless this moisture is otherwise removed from the atmosphere or head space of the container, it may be detrimentally absorbed by the medication. For this reason, it is a well known practice to include a desiccating unit together with the medication in the container.

In another example, electronic components may require reduced moisture conditions for optimal performance. These components may be sealed in containers, but excess moisture that is initially trapped therein must be removed. Furthermore, the housings may not be completely moisture tight, and moisture may be allowed to seep into the container. This moisture must also be retained away from the working components. For these reasons, it is important to include a desiccating agent within the housing for absorbing and retaining excess moisture. Because of the delicacy of many of the components that are to be protected from the moisture, it is important that the desiccant used not be of a "dusting" nature that may contaminate and compromise the performance of the components. Therefore, it has been recognized as advantageous to expose a desiccating agent to the interior space of such containers, while at the same time shielding the working components from actual contact with the desiccating material, including desiccant dust that may be produced therefrom.

In other instances, moisture may be released from items that have been placed in containers or sealed in packaging wrap for shipping and/or storage. Prime examples of such items are food stuffs—that release moisture during shipping and storage. In the instance of containers that are sealed and substantially impermeable to moisture, the released moisture will remain within the container. If not removed, this released moisture may have ill effects on the very item that released the moisture. It has been found that a substantial amount of moisture is released from certain food products within the first forty-eight (48) hours after manufacture and packaging. This released moisture will remain until removed. If the moisture is not removed shortly after its release, it may cause the food to degrade into a condition that is not saleable. In these cases, desiccants may be included together with the contained items to continually absorb the released moisture until the product is unpacked. In this way, a relatively dry environment is maintained about the stored item.

The need to eliminate moisture from within sealed containers has been previously recognized. Early attempts to achieve these goals included the provision of desiccant materials in fabric or similar bags that are placed in the containers together and commingled with the matter being shipped or stored. A consumer related problem, however, exists when the desiccant is loose and commingled together with consumable items. If not carefully and thoroughly processed upon unpacking, the desiccant may not be separated from the consumables and could harm a person if unknowingly ingested.

Several inventions have been patented that include both structures and processes that provide means for absorbing moisture by way of a desiccant that is included in various forms of packaging. A most basic example is found in the disclosure of U.S. Pat. No. 3,326,810 issued Jun. 20, 1967 to Dolan et al for a DESICCANT PACKAGE. That patent includes disclosure of a non-dusting silica gel desiccant bag. The bag is created from two sheets of nylon mesh that are bonded into a bag within which the silica gel is contained. Another known method by which a desiccant is included in a container is to provide a special side-compartment having limited exposure to the interior of the container. Examples of such inventions are found in U.S. Pat. No. 4,834,234 issued May 30, 1989 to Sacherer et al for a CONTAINER FOR TEST STRIPS. Sacherer provides a drying agent cell or compartment within the cap portion of a container for test strips that are used in the analysis of body fluids. It is disclosed that the drying agent cell is covered by a water vapor-permeable cardboard disc that separates that cell from the interior of the container. A similar example is found in U.S. Pat. No. 5,114,003 issued May 19, 1992 to Jackisch et al for a TABLET VIAL WITH DESICCANT IN BOTTOM. Jackisch includes disclosure of a desiccant canister that is secured to the bottom inside of a container's base. The desiccant canister within which the desiccating material is contained is initially sealed to prevent the absorption of moisture. Immediately prior to use, the desiccant canister is punctured and communication of moisture across the container is allowed to the desiccant.

In another example, separate capsules of desiccant that are expensive to produce are provided within the packaging. U.S. Pat. No. 4,783,206 issued Nov. 8, 1988 to Cullen et al for an ADSORBENT CARTRIDGE describes an elongated hollow cylindrical body fabricated of polyethylene, polyester or polypropylene. A desiccating agent is enclosed within the cartridge thereby maintaining the desiccant separate from other items commonly contained within the common container. By the cartridge's construction, it is intended that moisture pass only through the end caps constructed of spun-bonded polyolefin, and not the rigid, high density plastic side walls of the cartridge. A DRYING CAPSULE is disclosed in U.S. Pat. No. 2,638,179 issued May 12, 1953 to Yard. The drying capsule of Yard includes a desiccant that is encapsulated within a moisture permeable skin. The desiccant, which is contained within the capsule, absorbs moisture from the skin, and not directly from the outside atmosphere. The gelatin capsule is used as a regulator for governing the rate at which moisture is absorbed by the desiccating agent.

Another instance in which desiccant agents have been combined with polymers is found in layered plastic sheeting in which an interior oxygen impermeable layer must be protected against moisture which compromises the oxygen barrier characteristics of that interior layer. Examples of such utilization of a desiccant in a layered structure may be found in United States patents that are assigned to the American Can Company of Greenwich, Conn. and to the Kuraray Co., Ltd. of Kurashiki, Japan. Those United States patents include numbers U.S. Pat. Nos. 4,407,897; 4,425,410; 4,464,443; 4,770,944 and 4,792,484. In the disclosure of these several patents, the laminated structure has an interior layer that serves as an oxygen barrier and is manufactured from such polymers as ethylene vinyl alcohol (EVOH); in each instance, the EVOH is provided solely as an oxygen barrier. These EVOH layers serve as oxygen barriers as long as their moisture content remains below certain levels. In at least one application described in those patents, the layered packaging is used for food products that must be sterilized in a retorting process in which the food product, together with the packaging is steam treated. During the steam treatment process, the protective outer layers which are commonly manufactured from polypropylene and polyethylene and moisture impermeable at lower temperatures, permit the transmission of moisture thereacross at the elevated temperatures of the retorting process. The EVOH layer loses its oxygen barrier characteristics above a certain moisture level. Desiccant is therefore added to the adhesive layers adjacent to the EVOH layer to control the moisture levels within the oxygen barrier layer within the interior of the layered sheets so that the oxygen barrier layer can maintain its oxygen barrier properties. The only purpose of the described inventions of those patents is to maintain the interior EVOH layer of the laminate at relatively low moisture levels to assure its performance as an oxygen barrier.

An example of a desiccating agent being combined with a polymer binding material is found in U.S. Pat. No. 4,665,050 issued May 12, 1987 to Degen et al for SELF-SUPPORTING STRUCTURES CONTAINING IMMOBILIZED INORGANIC SORBENT PARTICLES AND METHOD FOR FORMING THE SAME. Therein, it is explained that sorbent particles are mixed into a softened, but not melted thermoplastic material such as polyethylene or polypropylene. By only softening the polymer medium, "blinding" of the sorbent material is prevented. That is, exterior portions of the sorbent material must be exposed and not blocked by the surrounding polymer. In this manner, moisture is transmitted into the sorbent material at those locations that are not covered by the binding polymer. It is explained that the polymer should only be softened to an extent that it becomes slightly tacky and does not become so viscous as to flow.

The combination of a moisture-absorbent substance with a thermoplastic resin is disclosed in U.S. Pat. No. 5,078,909 entitled MOISTURE-ABSORBENT COMPOSITIONS AND MOLDED ITEMS that issued Jan. 7, 1992 to Shigeta et al. Therein, it is contemplated that a thermoplastic resin, which may include polyethylene, polypropylene, as well as others may be employed in the formation of the composition. The inclusion of various moisture absorbing agents are required in order to obtain absorbtion by the desiccating agent.

It is also known to entrain desiccant directly into plastics and rubbers. An example of such entrainment is found in U.S. Pat. No. 3,245,946 issued Apr. 12, 1966 to O'Connor et al for RUBBER AND PLASTIC FORMULATIONS AND PROCESS. Therein, the entrainment of a desiccating agent into rubber, plastic, and resin formulations during their production is utilized to contain moisture produced during the manufacture of those materials that would otherwise adversely affect the produced material.

A flexible desiccant body is disclosed in U.S. Pat. No. 4,013,566 issued Mar. 22, 1977 to Taylor. Therein, a desiccant material is homogeneously distributed and bound in a moisture transmissive aliphatic epoxy polymer matrix. Therein, it is specifically recognized that polypropylene bags are not suited as containment material because of potential attrition problems due to melting or thermoplasticity of the bags during use.

Prior to the present invention, the establishment of channels throughout a desiccant entrained polymer has not been known. The present invention, has been developed in response to a recognized need for structures constructed from polymers that normally act as moisture barriers in their solid, rigid state, but when produced according to the present invention have a desiccant entrained therein which is capable of absorbing moisture exterior to the polymer.

SUMMARY OF THE INVENTION

As previously stated, a primary drawback of entraining a desiccant within a polymer matrix is the creation of a moisture impermeable polymer encasement about the individual desiccant particles contained within the structure. The present invention discloses both a structure and a method by which passages are established throughout the polymer matrix that communicate the entrained desiccant particles to the appropriate areas of the exterior of the plastic body in a manner that permits moisture to migrate from outside the plastic structure to interior locations where the desiccant particles are positioned. Furthermore, these channels or veins through which the moisture is permitted to travel may be occupied by agents or compounds that absorb and transport moisture at rates even greater than those achieved by the desiccant. The transporting agents are used to act as bridges from the surface of the plastic bodies inwardly to the desiccant particles positioned within the plastic structure.

Figure 1:
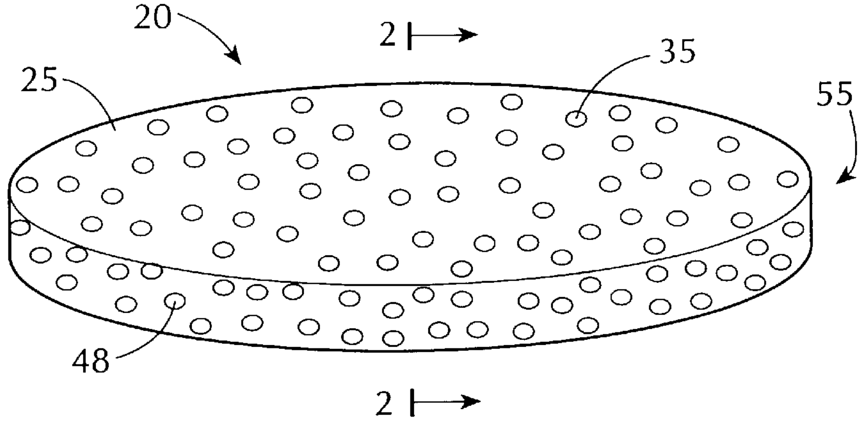
FIG. 1 is a perspective view of a plug, insert, or tablet constructed from channeled, desiccant entrained polymer showing, in an exaggerated scale, the openings of the channels at the exterior surface of the plug.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

It has been discovered that certain compounds, which are referred to herein as channeling agents, may be reacted with a polymer base matrix that is used in the formation of shaped articles. In practice, the polymer base material into which the channeling agent is blended and then reacted includes, as examples, any anhydride or amine or acid or cyanate or isocyanate or hydroxy functionalized polymer.

In one embodiment, prior to reacting the channeling agent with the polymer, the desiccant and channeling agent are added to the polymer when the polymer base is in a molten state or before the polymer is in the molten state, so that these additive agents may be blended and thoroughly mixed throughout the base polymer material to insure that all of the materials are thoroughly mixed before reaching the melt phase. For example, such a technique is useful when the desiccant, channeling agent and polymer base are all powders.

In another embodiment, the channeling agent and polymer are mixed and reacted prior to adding the desiccant. The channeling agent is then added either before the polymer is in the molten state or after the polymer is in the molten state. For example, the desiccant material may be added to the polymer base reacted with the channeling agent during the thermoforming process of sheets of plastic material.

After thoroughly blending and reacting the materials together, the channeling agent forms veins or channels that act as moisture communicating passages throughout the polymer. Suitable channeling agents include polyglycol such as polyethylene glycol, ethylene-vinyl alcohol (EVOH), polyvinyl alcohol (PVOH), glycerin polyamine, polyurethane and polycarboxylic acid including polyacrylic acid or polymethacrylic acid. In one embodiment of the present invention, when the polymer matrix used is a polymer containing acid and/or anhydride groups, the channeling agent should be selected from the group of channeling agents including polyglycol, polyhydroxy or polyamine. In another embodiment of the present invention, when the polymer matrix used is a polymer containing amine groups, the channeling agent should be selected from the group of channeling agents including polycarboxylic acid.

By forming the composition of the present invention, the polymer base and channeling agent do not separate out into distinct levels or phases, one above the other, but instead establish veined domains of channeling agent that extend across the polymer base thereby establishing channels or passages through the polymer. The channels are open at the surface of the polymer structures and thereby provide access for moisture to interior portions of the polymer matrix.

Various types of desiccating agent are known in the art and may be used with the present invention. In general, there are three primary types of desiccating agents that may be used with the present invention.

The first type comprises chemical compounds that form crystals that contain water. Examples of such desiccant are anhydrous salts which tend to absorb water or moisture and form a stable salt. In this reaction with the moisture, a stable compound is formed within which the moisture is held and prevented from release.

The second type of desiccant compounds are those which are considered to be reactive. These compounds typically undergo a chemical reaction with water or moisture and form new compounds within which the water is combined. These newly formed compounds are generally irreversible at low temperature and require a significant amount of energy to be regenerated so that they may be reused as a desiccant. These reactive type desiccants are mainly used in solvent drying and as additives to polymers which must themselves be maintained in a moisture reduced state. One application in which these reactive type compounds are particularly suitable was described above with respect to the multi-layer sheeting within which a layer of EVOH is laminated between two shielding layers of what is normally moisture impermeable material such as polypropylene or polyethylene. As earlier noted, however, these types of sheeting or wrap are used to package food products which must subsequently be sterilized in a retorting process wherein the packaged good is exposed to hot sterilizing steam. At the elevated temperatures, the exterior layers permit moisture to pass therethrough and compromise the oxygen barrier effectiveness of the EVOH interior layer. Because of the reactive desiccant that has been entrained that moisture is absorbed into the desiccant and retained therein away from the EVOH layer thereby allowing the EVOH layer to maintain its oxygen barrier characteristics.

The third type of desiccants obtain their moisture absorbing capabilities through physical absorption. The absorption process is accomplished because of a fine capillary morphology of the desiccant particles which pulls moisture therethrough. The pore size of the capillaries, as well as the capillaries' density determine the absorption properties of the desiccant. Examples of these physical absorption desiccants include molecular sieves, silica gels, clays and starches. Because these types of physical absorption desiccants are both inert and non-water soluble, they are preferred for many applications. Among other reasons, these innocuous characteristics are particularly compatible with food products and medicinal products that may be enclosed within containers formed from the desiccant entrained polymers, or at least exposed thereto. As stated previously, however, any of the three types may be employed within the polymer bases of the present invention for the purposes of producing a desiccant entrained polymer. Suitable desiccating agents include silica gel, molecular sieve and naturally occurring clay compounds which would also include montmorillimite clay. Similarly, all three types of desiccant may be compatible with most channeling agents that are employed.

In one embodiment, desiccating agents are selected having a polarity that causes an affinity between the desiccant and the channeling agent. An example of such a polar desiccant is silica which is attracted and more compatible with the channeling agent than it is with the polypropylene or polyethylene polymer base. For this reason, during the separating process when the channels are formed throughout the polymer base, it is believed that the desiccating agent will also migrate toward the channeling agent domains to which it is attracted. In this manner, it is theorized that the channeling agent is permitted to act as a bridge between moisture located exteriorly to the polymer structure and the desiccant that is located within the polymer. This is particularly true with respect to a desiccant that is bound within the channeling agent filled passages. In a further embodiment, polar plastisizers such as glycerin may be further added to the mixture which enhance the dispersion or mixing of the desiccant into the channeling agent. The desiccating agent which is primarily concentrated within the channeling agent picks up the moisture from the transmitting channeling agent and retains it therein. In this way, the moisture is quickly pulled throughout the channels or passages and made available to the desiccating particles or agents which are dispersed throughout the plastic body.

It is believed that the higher the desiccant concentration in the mixture, the greater the absorption capacity will be of the plastic structure created therefrom. However, the higher desiccant concentration may cause the body to be more brittle and the mixture to be more difficult to either thermally form, extrude or injection mold. For that reason, it is believed that a maximum desiccant load of about 80 percent by weight with respect to the polymer base may be obtainable. In another embodiment, the desiccant loading level can range from 10% to 20%, 20% to 40% and 40% to 60% by weight with respect to the polymer base.

In general, the matrix base polymer of the present invention which can be used in making the structures of the present invention can be basically any functionalized thermoplastic including anhydride or amine or acid or cyanate or isocyanate or hydroxy functionalized polymer. Examples of suitable matrix base polymer of the present invention include polypropylene maleic anhydride, polyethylene maleic anhydride, polystyrene maleic anhydride, polyethylene acrylic acid, polyethylene-urethere, polyethylene-EVOH and polyethylene-nylon. Other suitable thermoplastic materials include grafted polyolefins, polycarbonates, polyamides, ethylene-vinyl acetate partially hydrolyzed polymers, ethylene-methacrylate partially hydrolyzed polymer, grafted polyvinyl chloride, grafted polystyrene, polyester, polyester amide, polyacrylic partially hydrolyzed ester, acrylic, polyurethane and polyacetal or mixtures thereof.

The channeling agent used in the present invention can be generally any hydrophilic material. In one embodiment, the hydrophilic material is a polar compound having at least two hydroxy groups. Suitable channeling agents of the present invention include polyglycols such as polyethylene glycol and polypropylene glycol and mixtures thereof. Other suitable materials include EVOH, glycerin, pentaerithritol, PVOH, polyvinylpyrollidine, vinylpyrollidone or N-methyl pyrollidone, with polysaccharide based compounds such as glucose, fructose, and their alcohols, and mannitol being suitable for the purposes of the present invention since they are hydrophilic compounds having numerous hydroxy groups.

The reaction conditions between the matrix base polymer and the channeling agent are chosen to result in a complete reaction of the polymer and the channeling agent. Consequently, sufficient time and temperature are employed to result in a complete reaction of the components. In one embodiment of the present invention, the channeling agent and polymer are first blended together. Subsequently, the mixture is reacted at about 400 to 450° F. for about 1 to about 5 minutes. It is understood that any suitable reactor equipment may be used with the present invention including a continuous reactor such as an extruder or a batch reactor such as a continuous stirred tank reactor.

In another embodiment of the present invention, the components are first dry mixed in a mixer such as a Henschel, and then fed to a compounder. A Leistritz twin screw extruder, for example, or a Werner Pfleider mixer can be used to achieve a good melt mix and reaction at about 400° F. The melt can then be either extruded to form a shaped article such as a film or converted into pellets using dry air cooling on a vibrating conveyer. The formed pellets, containing channels, can, for example, then be either injection molded into beads, sieves, or co-injected with polypropylene as the inside layer of a container.

In one embodiment, because the desiccant entrained polymer is typically more brittle than a polymer without the desiccant, the package may be molded so that an interior portion of the package is desiccant entrained while the exterior portions are formed from pure polymer or a desiccant entrained plastic with a lower desiccant loading level. For example, a package having an interior portion composed of desiccant entrained polymer and an exterior portion composed of pure polymer typically will not only be more durable and less brittle, but it will also act as a moisture barrier that resists the transmission of moisture from the exterior into the interior of the package. In this manner, the moisture absorption capacity of the desiccant agent is potentiated by exposing it exclusively to the interior of the package from which it is desired that moisture be withdrawn and retained therefrom.

As has been previously discussed, the desiccant entrained polymer of the present invention has many applications. One embodiment is the construction of rigid containers that are suitable for containing relatively small volumes of product such as food stuffs and medicines. In many cases, these types of products must be shipped and stored in reduced moisture environments. In another embodiment, desiccant entrained polymer inserts may be constructed according to the present invention for inclusion within the interior of the container. An example of one form of an insert is a plug of any suitable shape formed from desiccant entrained polymer. While the plug would serve its purpose by being merely deposited within the moisture barrier container, it may also be fixed to an interior location so that it does move about within the interior space. In a further embodiment, it is anticipated that a plug formed into a disc may be shaped and sized to be pressed fit into the bottom of a polymer formed container.

In another embodiment, a liner may be formed from the desiccant entrained polymer that has an exterior surface substantially conforming to an interior surface of the container body. Like the disc, the liner may be sized so that it may be press-fit into position within the polymer body where it is held sufficiently snugly to prevent its unintended disengagement therefrom. Alternatively, in a further embodiment, either the plug or liner may be initially constructed and allowed to harden, and then the container body subsequently constructed thereabout so that the greater shrinkage characteristics of the polymer body not containing desiccant tightly shrink-fits the container body about the plug or liner so that neither becomes easily disengaged from the other. In still a further embodiment, the insert taking the form of either a plug or a liner may be substantially simultaneously comolded with the polymer container body so that each is integrally joined with the other. In the event of a co-molding process, the viscosities of the desiccant laden insert and the polymer container body should typically be approximately equal to facilitate the proper and desired location of the two phases of liquid or molten material that are molded together.

In yet another embodiment, the desiccant entrained polymer may be used to form sheeting that is joined with a non-desiccant entrained polymer sheet. In at least one embodiment, the sheets are effectively laminated one to the other so that an exterior layer may be established adjacent to the desiccant entrained layer which is substantially moisture impermeable. The laminate sheet may then be used to wrap an item which is to be stored in a moisture-reduced environment. One means by which the joinder process may be accomplished is through a thermal extrusion procedure.

In each of the embodiments of the present invention described herein, advantages and enhancements over the prior art methods and structures stem from the discovery of the ability to create passages throughout a desiccant entrained polymer so that a rigid body may be constructed from the polymer while also exposing the entrained desiccant to moisture exterior to that structure. Furthermore, the discovery of employing a channeling agent that also acts as a moisture bridge between the exterior of the polymer body and interiorly located desiccant greatly enhances the structures' ability to quickly remove moisture located exteriorly to the entrained structure, while at the same time taking advantage of a greater portion of the desiccating capacities of the desiccating agent entrained therein.

One embodiment of the present invention includes a process for producing moisture absorbing desiccant containing polymer. The process comprises blending and reacting any amine or acid or hydroxy functional polymer with a channeling agent under suitable blending and reaction conditions. Either prior to the reaction or after the reaction, a desiccating agent is blended into the polymer so that the desiccating agent is distributed within the polymer and the channeling agent is distributed within the polymer. Subsequently, after the composition is solidified, the result is that the channeling agent forms passages in the composition through which moisture is communicable to desiccating agent entrained within the composition. In another embodiment, the polymer, channeling agent and desiccant are all thoroughly mixed in dry, powder form, and then the polymer mix is melted, reacted and formed into a desired shape by molding. The channeling agent thereby forms passages in the composition through which moisture is communicable to desiccating agent entrained within the composition.

In another embodiment, the desiccant entrained composition is used to form a plug for inclusion within a package constructed of a moisture barrier substance. In another, the desiccant entrained composition is used to form a liner for inclusion within a container constructed from a moisture barrier substance. In still another embodiment, the desiccant entrained composition is used to form a desiccating sheet. The desiccating sheet may optionally be combined with a barrier sheet constructed of a moisture barrier substance for use as a packaging wrap. In another embodiment, the desiccant entrained composition is used to form a moisture absorbing insert for a container.

Figure 2:
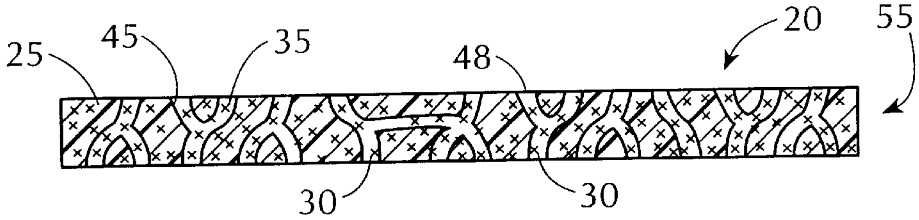
FIG. 2 is an exaggerated, cross-sectional view of a solidified plug formed from a polymer reacted with channeling agent and a desiccating agent blended therewith.
Figure 5:
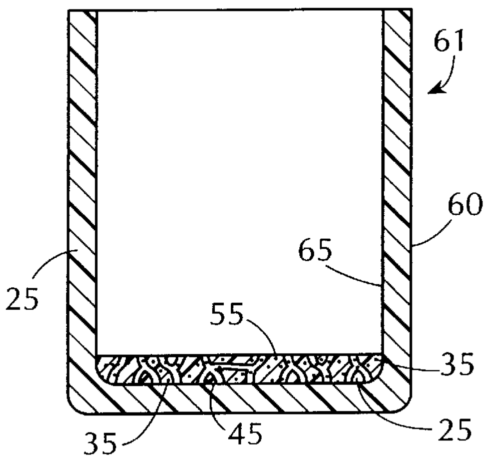
FIG. 5 is an exaggerated cross-sectional view of a portion of a container having a desiccant entrained plug insert located in the bottom of a container constructed from a polymer that acts as a moisture barriers.

Referring to FIG. 1 of the accompanying drawings, an insert constructed from a desiccant entrained polymer 20 is illustrated. For purposes of this disclosure of the present invention, the words "entrain", "contain" and "blend" have been used interchangeably when referring to the inclusion of a desiccating agent 30 in a polymer 25 matrix. The insert is in the form of a plug 55 that may be deposited into a container body 60 (FIG. 5) thereby establishing a desiccating container 61 (FIG. 5). Referring to FIG. 2, a cross-sectional view is shown of the plug 55 that has been constructed from a polymer mixture comprising a polymer base 25 that has been blended with a desiccating agent 30 and a channeling agent 35. In the illustration of FIG. 2, the composition of the present invention has been solidified so that veins or channels 45 have formed throughout the polymeric composition to establish passages throughout the solidified plug 55. As may be appreciated in both FIGS. 1 and 2, the passages terminate in channel openings 48 at an exterior surface of the plug 55.

Figure 3:
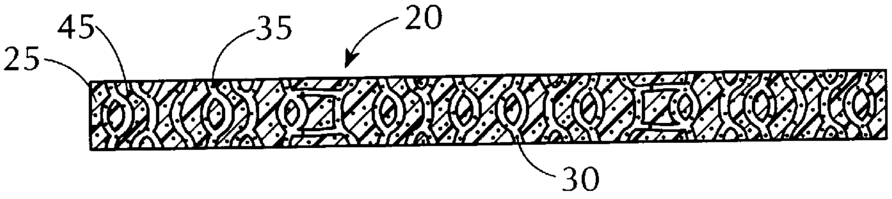
FIG. 3 is an exaggerated, partial cross-sectional view of a solidified plug formed from a polymer reacted with a channeling agent and a desiccating agent blended therewith.

FIG. 3 illustrates a plug 55 similar in construction and makeup to the plug 55 of FIG. 2, where the channels or veins are very fine. This can result from the use of polyglycols as the channeling agent, or the use of a plasticizer together with a less preferred channeling agent. Upon solidification of the composition, the passages which are formed therethrough have a greater dispersion and a smaller porosity thereby establishing a greater density of passages throughout the plug 55. This same effect occurs readily when a polyglycol is used as the channeling agent due to the general comparability of polyglycols with hydrophobic thermoplastics such as polyolefins. The channels or passages are created to provide pathways through which moisture can travel from the exterior of the solidified plug 55 to interior locations where entrained desiccant 30 is bound. These passages are required because of the hydrophobic characteristics of the polymer 25 which resist moisture permeability therethrough and therefore acts as a moisture barrier. For this reason, the polymer 25 itself is referred to as a moisture barrier substance within which a desiccant 30 may be entrained. To expose the desiccant 30 entrained within the interior of the polymer 25, however, the channels 45 are provided. Without the passages 45, relatively small quantities of moisture would be absorbed by the entrained desiccating agent 30. These small amounts derive from the limited number of desiccant particles 30 that would be exposed at the exterior surface of the formed body and the very small amounts of moisture that would be able to pass through the substantially moisture impermeable polymer 25. Because of these characteristics, the polymer 25 is referred to as a moisture barrier even though it may not be completely impermeable to moisture. In the illustration of FIG. 3, the passages 47 can be enhanced by a plasticizer, but the desiccating agent 30 is evenly distributed throughout the matrix. As a result, at least portions of the desiccating agent 30 will be entrained within the polymer 25 which resist transmission of moisture and therefore seals those particles of desiccating agent 30 within the polymer 25 from moisture absorption.

Figure 4:
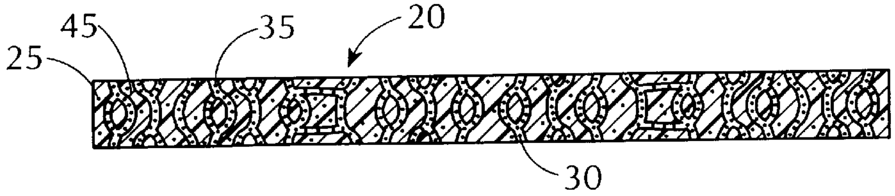
FIG. 4 is an exaggerated, partial cross-sectional view of a solidified plug formed from a polymer reacted with a channeling agent and a polarized desiccating agent blended and reacted therewith.

FIG. 4 illustrates a solidified plug 55 wherein the desiccating agent 30 has been selected so that it is polarized and therefore attracted to the channeling agent 35. As a result, during the solidification process, the desiccating agent 30 aggregates in the channeling agent 35 and becomes entrained therein in a concentration higher than in the polymer 25. As a result, a greater percentage of the desiccating agent 30 is entrained within the channeling agent 35 and therefore placed in communication with moisture exterior to the plug 55 thereby improving the plug's 55 moisture absorbing characteristics.

In at least one embodiment, the channeling agent 35 is selected so that it has a property which encourages transmission of moisture thereacross. The rate at which moisture is transmitted across the channeling agent 35 is greater than the rate at which moisture may be transmitted across the polymer 25. This tends to provide a ready supply of moisture, when present, to the desiccating agent 30 entrained within the channeling agent 35 and to that desiccating agent 30 that is entrained within the polymer 25, but adjacent to and exposed to the channeling agent 35. Examples of channeling agents 35 having these characteristic are the polyglycols, EVOH and PVOH, each of which transmit moisture at a rate greater than the polymer 25 and the desiccating agent 30. As a result, the channeling agent 35 acts as a bridge between moisture exterior to the plug 55 and the desiccating agent 30 entrained within the plug's 55 interior.

FIG. 5 illustrates a plug 55 which has been deposited into a container body 60 thereby establishing a desiccating container 61. The container body 60 has an interior surface 65 and is constructed substantially from a moisture barrier polymer 25. In this manner, moisture is resisted from being transmitted across a wall of the container 60 when the container 60 is closed. As may be seen in FIG. 5, the plug 55 has been press fit into a bottom location of the container 60. It is contemplated that the plug 55 may be merely deposited in the container 60 for loose containment therein, but it is preferable coupled to the body of the container 60 in a manner that fixes the plug 55 to the container 60. The couple between the plug 55 and the container body 60 is intended to prevent the dislocation and relative movement of the plug 55 thereabout. This connection may be accomplished by a snug press fit between the plug 55 and the interior surface 65 of the body 60, or it may be mechanically connected in such manners as adhesives, prongs, lips or ridges that extend about the plug 55 to hold the plug 55 in place. In yet another embodiment, it is contemplated that the container body 60 may be molded about the plug 55 so that during the curing process of the container body 60 the body 60 shrinks about the plug 55 thereby causing a shrink-fit to be established between the two components. This type of couplement may also be accomplished in a comolding process or sequential molding process with the same results achieved because the desiccant entrained plug 55 will have less shrinkage than the polymer 25 comprised container body 60.

Figure 6:
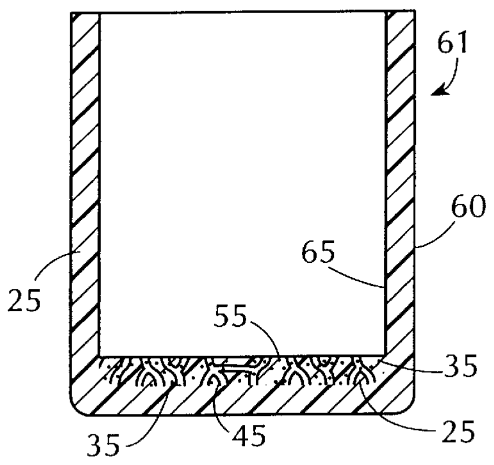
FIG. 6 is an exaggerated cross-sectional view of a portion of a container having a desiccant entrained plug that has been comolded into the bottom of a container that is constructed from a polymer that acts as a moisture barrier.

FIG. 6 illustrates a desiccating container 61 having a desiccant entrained plug 55 located at a bottom location of the container 60 similar to the configuration illustrated in FIG. 5, but the plug 55 and container body 60 are comolded so that a unified body 61 is formed with a less distinct interface between the plug 55 and body 60 components.

Figure 7:
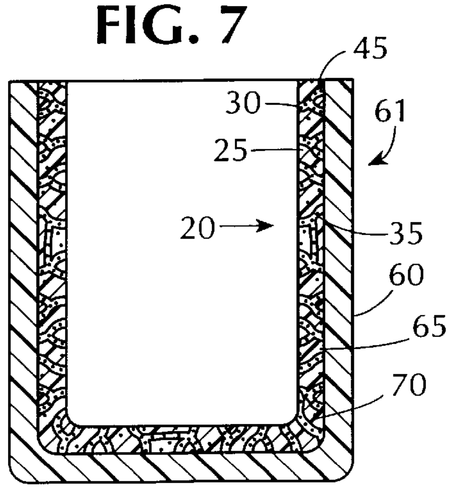
FIG. 7 is an exaggerated cross-sectional view of a portion of a container having a desiccant entrained liner insert located within the interior of a container constructed from a polymer that acts as a moisture barrier.
Figure 8:
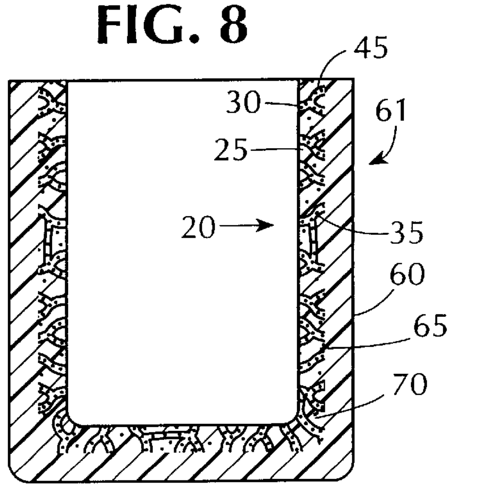
FIG. 8 is an exaggerated cross-sectional view of a portion of a container having a desiccant entrained liner that has been comolded at the interior of a container that is constructed from a polymer that acts as a moisture barrier.

FIGS. 7 and 8 illustrate concepts similar to those of FIGS. 5 and 6, however the proportions of the plug 55 have been extended so that a liner 70 is formed which covers a greater portion of the interior surface 65 of the desiccating container 61. The liner 70 is not localized in the bottom portion of the container body 60, but has walls which extend upwardly and cover portions of the walls of the container 61. Like the plug 55, the liner 70 may be separately molded and subsequently combined with the container body 60 or it may be comolded therewith into the unified body illustrated in FIG. 8.

Figure 9:
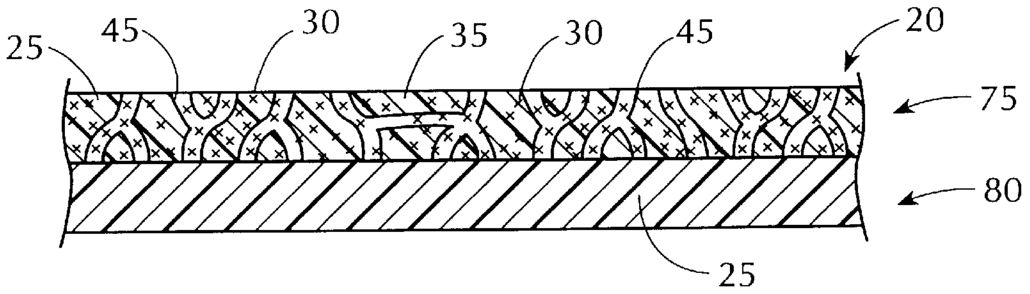
FIG. 9 is an exaggerated cross-sectional view of a desiccating sheet or area located adjacent to a barrier sheet constructed from a polymer that acts as a moisture barrier.
Figure 10:
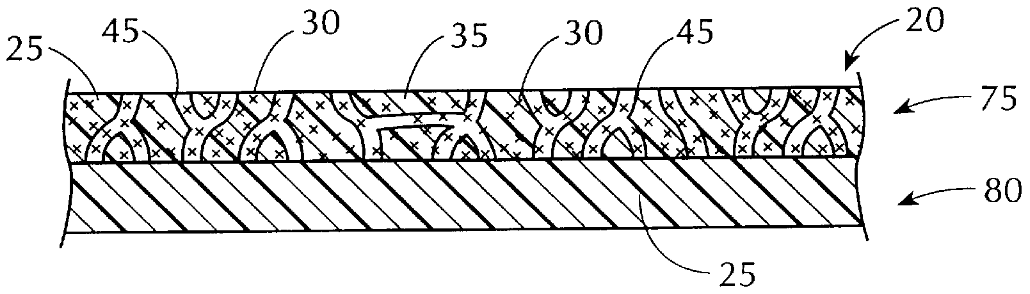
FIG. 10 is an exaggerated cross-sectional view of a desiccating sheet or area that has been comolded at an interior of a barrier sheet so that the products are integrally molded together and comprise one unified laminate.

FIGS. 9 and 10 illustrate an embodiment of the invention in which a desiccating sheet 75 is created for combination with a barrier sheet 80. The characteristics of the sheets are similar to those described with respect to the plug 55 and liner 70 and container body 60. That is, FIG. 9 illustrates an embodiment in which the two sheets 75, 80 are separately molded, and later combined to form a packaging wrap having desiccating characteristics at an interior surface and moisture resistant characteristics at an exterior surface. FIG. 10 illustrates a comolded process wherein an interface between the desiccating sheet 75 and the barrier sheet 80 is less distinct than in the embodiment of FIG. 9. This product can be produced by a thermal, forming process. In such a process, the polymer layer is melted and partially formed into a sheet with the desiccating agent 30 being deposited on top of that layer just prior to being pressed or extruded through a slit like opening in the thermal forming machine. It is contemplated that the separate sheets 75, 80 of FIG. 9 may be joined together with an adhesive or other suitable means to form a laminate from the plurality of sheets 75, 80. Alternatively, the sheeting 75, 80 may be manufactured from a thermal extrusion process whereby both sheets 75, 80 are manufactured at the same time and effectively comolded together to form the embodiment illustrated in FIG. 10.

In view of the descriptions provided above relevant to possible embodiments of the present invention and the included figures illustrating the same, the following embodiments are also disclosed. In one embodiment, the present invention includes a process for producing a moisture absorbing desiccant entrained polymer 20. A reacted product is caused to assume a molten state, typically by applying heat and melting the polymer A desiccating agent 30 is then blended into the reacted product so that the desiccating agent 30 is distributed within the composition. The final composition is solidified so that the channeling agent 35 forms passages in the mixture through which moisture is communicable to desiccating agent 30 that is entrained within the composition.

The channeling agent 35 facilitates diffusion of moisture therethrough at a rate greater than the desiccating agent 30 or the polymer 25.

The desiccating agent 30 has a greater moisture absorbing capacity by weight than the channeling agent 35 or the polymer 25. The desiccating agent 30 has a greater attraction for the channeling agent 35 than for the polymer 25. As a result, upon solidification of the composition, a greater concentration of desiccating agent 30 forms in the channeling agent 35 than in the polymer 25.

In a further embodiment of the present invention, a plug 55 is formed from the mixture for inclusion within a container 60 that is constructed from a moisture barrier substance.

In one embodiment, the plug 55 is deposited into a container 60 that is constructed from a moisture barrier substance. In this manner, a desiccating container 61 is created.

The plug 55 may be coupled to an interior surface of the container body 60 so that the plug 55 is fixed relative to the container 60.

Alternatively, a container 60 constructed from a moisture barrier substance may be molded about the plug 55 so that at least a portion of the plug 55 is exposed to an interior of the container 60.

A desiccating plug 55 made according to the present invention may also be co-molded with a container 60 that is constructed from a moisture barrier substance so that at least a portion of the plug 55 is exposed to an interior of the container 60.

In another embodiment, a liner 70 may be formed from the mixture 40 and then be included within a container 60 constructed from a moisture barrier substance. The liner 70 typically, but not necessarily, has an exterior surface configured for mating engagement with an interior surface 65 of the container 60.

The liner 70 may be pressed into mating engagement with the container 60 so that a desiccating container 61 is created wherein at least a majority of the interior surface 65 of the container is covered by the liner 70.

The liner 70 may be formed from the mixture 40 and then a container 60 constructed from a moisture barrier substance may be molded about the liner 70 so that at least a portion of the liner 70 is exposed to an interior of the container 60 and a majority of an interior surface 65 of the container 60 is covered by the liner 70.

Alternatively, the liner 70 and container body 60 may be comolded together into a unified body.

The desiccating sheet 75 is combined with a barrier sheet 80 that is constructed of a moisture barrier substance for use as a packaging wrap.

The sheets 75, 80 may be laminated by thermal extrusion.

In still another embodiment of the present invention, a method for making a desiccating container 61 is provided. The method includes forming a container 60 from substantially moisture impermeable material so that a moisture barrier is created between an interior and exterior of the container. An insert is formed from the desiccant entrained polymer. The insert has an exterior surface that is configured for mating engagement with at least a portion of an interior surface 65 of the container 60. The insert is installed into the interior of the container 60 so that at least a portion of the exterior surface of the insert abuttingly engages the interior surface 65 of the container 60. The engagement fixes the insert relative to the container 60 and resists disengagement of the insert from the container 60. The insert is channeled with passages 45 so that desiccant 30 within an interior of the insert is exposed to the interior of the container 60 for absorbing moisture. The insert is pressed into the interior of the container 60 with sufficient force that the insert fits tightly within the container 60 thereby resisting disengagement therefrom. The insert is sized and shaped so that the insert fits snugly into a receiving location within the interior of the container for retention at the receiving location.

In another embodiment, the insert is sized and shaped into a plug 55 that fits snugly into a receiving location at a bottom portion of the interior of the container 60 for retention at the receiving location.

In a further embodiment, the insert is configured into a liner 70 having an exterior surface that conforms to the interior surface 65 of the container 60 so that a majority of the liner's 70 exterior surface is in abutting engagement with the container's 60 interior surface 65. The container 60 and the liner 70 are similarly configured so that the interior 65 of the container 60 and the exterior of the liner 70 fit snugly together so that disengagement of the liner 70 from the container 60 is resisted.

In another example, the container 60 may be molded from a plastic that is substantially moisture impermeable and therefore resists the transmission of moisture across the boundary of the container 60 between its exterior and its interior. Also, the liner 70 may be molded from a desiccant entrained plastic 20 capable of absorbing and retaining moisture therein.

A further example relates to a releasable cap means that may also be provided for closing the container 60. In this way, the liner 70 is substantially sealed within the capped container 60 by installing the cap means upon the container. Moisture held within the interior volume of the container 60 may then be removed by the desiccant 30. A product may be stored in the substantially moisture free interior of the lined container 61 by enclosing the product therein.

In yet another embodiment, a method for making a desiccating container 61 is provided. A container is formed from substantially moisture impermeable material so that a moisture barrier is established between an interior and exterior of the container 60. A substantially solid tablet or plug 55 is formed from desiccant bearing material 20, the tablet 55 being suitably sized to fit within the interior of the container 60. The tablet 55 is then deposited into the interior of the container 60 thereby establishing a means for desiccating the interior of the container 60 when the container 60 is closed about the tablet 55.

In another embodiment of the present invention, a method for making desiccating packaging is provided. An outer skin, sheet, or layer 80 is formed from a substantially moisture impermeable sheet of material so that a moisture barrier is created between opposite sides of the skin. An inner skin, sheet, or layer 75 is formed from desiccant bearing material 20 at one side of the outer skin 80. A desiccating package is formed about a product or item by sealing the product or item within the outer moisture impermeable skin 80 and with the inner desiccating skin 75 located adjacent to the product. A desiccating laminate may be formed by suction vacuum molding the outer skin 80 and the inner skin 75 together to form desiccating packaging.

In one embodiment of the present invention, a desiccating enclosure 61 is provided. The enclosure includes a container 60 formed from substantially moisture impermeable material so that a moisture barrier is created between an interior and exterior of the container 60. A liner 70 is formed from desiccant bearing material 20 so that the liner 70 has an exterior surface configured for mating engagement with at least a portion of an interior surface 65 of the container 60. The liner 70 is inserted into the interior of the container 60 so that at least a portion of the exterior surface of the liner abuttingly engages the interior surface 65 of the container 60. The engagement fixes the liner 70 relative to the container 60 and resists disengagement of the liner 70 from the container 60.

In yet another embodiment of the present invention, a desiccating insert for a closeable container 60 includes a desiccating insert configured for installation into a closeable container 60. The insert is constructed from thermoplastic entrained 25 with a desiccating agent 30 that is distributed substantially evenly throughout an interior of the insert. The insert has passages extending from its exterior surface into its interior. Moisture is passable through the channels or passages thereby exposing portions of the desiccating agent 30 located within the interior of the insert to moisture located exteriorly to the insert for absorbing and retaining that exteriorly located moisture.

Desiccant entrained plastic structures, and their constituent compounds have been described herein. As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit and intended scope of the invention.

The present invention will be illustrated in greater detail by the following specific examples. It is understood that these examples are given by way of illustration and are not meant to be limited to the disclosure or claims. All percentages in the examples are elsewhere in the specification are by weight unless otherwise specified.

EXAMPLE 1

This example illustrates a product having about 45 wt. % of polyvinyl alcohol, about 5 wt. % of glycerine and about 55 wt. % of propylene maleic anhydride. Polyvinyl alcohol (from DuPont) is mixed with glycerin (liquid, from Dow) until the polyvinyl alcohol is evenly wetted by the glycerin. Propylene maleic anhydride (from Hoechst) is then blended with the mixture. The resulting blend is then fed to a twin screw extruder to react the mixture. The extruder is operated at about 400 to about 450° with a residence time of between about 20–45 seconds. The melt is extruded in a film and, subsequently, ground into a fine powder. This fine powder is mixed with silica gel. The powder-silica gel mixture is then extruded into a film. The silica gel in the film absorbs moisture.

Alternatively, after the reaction is completed in the extruder, the desiccant is then fed directly into the extruder. The desiccant entrained polymer is then extruded into a film.

EXAMPLE 2

This example illustrates a product having about 90 wt. % of propylene maleic anhydride and about 10 wt. % of glycerin. Propylene maleic anhydride is blended and reacted with glycerin at about 400° F. for about 5 minutes. Subsequently, a desiccant such as silica gel is blended with the reacted product. The blend is then extruded and formed into the desired shaped article.

EXAMPLES 3 AND 4

Example 3 illustrates a product having about 90 wt. % polyacrylic acid and about 10 wt. % polyethylene glycol. Example 4 illustrates a product having about 90 wt. % polypropylene or polyethylene or a blend thereof and 10 wt. % of a blend of polyglycol and maleic anhydride. The components are blended and reacted under suitable blending and reacting conditions. A desiccant is mixed with the reacted product. The product is then melted and extruded into a shaped article.

What is claimed is:

1. A process for producing a desiccant entrained polymer shaped article, the process comprising:

(a) blending a functionalized polymer and a channeling agent, wherein the channeling agent is a hydrophilic material;

(b) reacting the polymer and the channeling agent;

(c) blending a desiccant agent into the polymer-channeling agent reaction product to entrain the desiccant agent in the reaction product;

(d) solidifying the desiccant agent entrained polymer-channeling agent reaction product and forming the shaped article, whereby the channeling agent forms channels in the product.

2. The process of claim 1, wherein the polymer is selected from the group of functional polymers consisting of anhydride, amine, acid, cyanate, isocyanate and hydroxy functionalized polymers.

3. The process of claim 2, wherein the polymer is selected from the group consisting of propylene maleic anhydride, polyethylene maleic anydride, polyethylene acrylic acid, polyethylene-urethane, polyethylene-EVOH, polyethylene nylon, and polyamide.

4. The process of claim 1, wherein the channeling agent is a polar compound having one or more hydroxy groups.

5. The process of claim 4, wherein the channeling agent is selected from the group consisting of polyethylene glycol, polypropylene glycol, ethylene vinyl alcohol, polyvinyl alcohol and glycerin.

6. The process of claim 1 wherein the polymer is melted prior to blending and reacting with the channeling agent.

7. The process of claim 1 wherein the desiccating agent is a molecular sieve.

8. The process of claim 1 further comprising:

forming a plug from the product for inclusion within a container constructed of a moisture barrier substance.

9. The process of claim 8 further comprising:

depositing the plug within a container constructed from a moisture barrier substance thereby creating a desiccating container; and coupling the plug to an interior surface of the desiccating container so that the plug is fixed relative to the container.

10. The process of claim 8 wherein the step of forming the plug further comprises:

comolding a container constructed from a moisture barrier substance with the plug so that at least a portion of said plug is exposed to an interior of the container.

11. The process of claim 1, wherein the solidified product is formed into a sheet.

12. The process of claim 11 further comprising:

combining the desiccating sheet with a barrier sheet constructed of a moisture barrier substance.

13. A desiccating insert for a closeable container comprising:

a desiccating insert configured for installation into a closeable container;

said insert constructed from the process of claim 1; and said insert having channels extending from an exterior surface of said insert into said insert's interior through which moisture is passable thereby exposing portions of said desiccating agent located within the interior of said insert to moisture located exteriorly to said insert for absorbing and retaining that exteriorly located moisture.

14. The process of claim 1 wherein the shaped article is selected from the group consisting of a film, sleeve and beads.

15. A process for producing a desiccant entrained polymer shaped article, the process comprising:

(a) blending an desiccant agent, a channeling agent, wherein the channeling agent is a hydrophilic material, and a functionalized polymer;

(b) reacting the blend to form the desiccant agent entrained polymer;

(c) solidifying the desiccant agent entrained polymer to form a shaped article having channels formed by the channeling agent.

16. The process of claim 15, wherein the polymer is selected from the group of functional polymers consisting of anhydride, amine, acid, cyanate, isocyanate and hydroxy functionalized polymers.

17. The article of claims 1 or 15 wherein the article is in a form of a sheet.

18. The article of claims 1 or 15, wherein the article is extruded into a shaped article.

19. The article of claims 1 or 15, wherein the desiccating agent is selected from the group consisting of a silica gel, molecular sieve and clay.

20. The article of claim 1 or 15, wherein the article is a container.

21. The article of claims 1 or 15, wherein the polymer is a thermoplastic.

22. The article of claims 1 or 15, wherein the channeling agent is selected from the group consisting of a polyglycol, glycerin, ethylene-vinyl alcohol and polyvinyl alcohol.

23. The article of claims 1 or 15, wherein the article is in the form of a disc.

24. The article of claims 1 or 15, wherein the article is in the form of a film.

25. The article of claims 1 or 15, wherein the article is in a form of a sleeve.

26. The article of claims 1 or 15, wherein the article is in a form of beads.

* * * * *